United States Patent
Sahlsten et al.

(10) Patent No.: US 9,983,413 B1
(45) Date of Patent: *May 29, 2018

(54) DISPLAY APPARATUS AND METHOD OF DISPLAYING USING CONTEXT AND FOCUS IMAGE RENDERERS AND OPTICAL COMBINERS

(71) Applicant: Varjo Technologies Oy, Helsinki (FI)

(72) Inventors: Oiva Arvo Oskari Sahlsten, Salo (FI); Mikko Ollila, Tampere (FI)

(73) Assignee: Varjo Technologies Oy, Helsinki (FI)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/650,796

(22) Filed: Jul. 14, 2017

Related U.S. Application Data

(63) Continuation-in-part of application No. 15/366,424, filed on Dec. 1, 2016, now Pat. No. 9,711,072.

(51) Int. Cl.
*G06F 1/00* (2006.01)
*G02B 27/10* (2006.01)
(Continued)

(52) U.S. Cl.
CPC ..... *G02B 27/1066* (2013.01); *G02B 26/0816* (2013.01); *G02B 27/0093* (2013.01);
(Continued)

(58) Field of Classification Search
CPC ..... G06T 19/006; G06T 19/20; G06T 15/503; G06F 3/013
See application file for complete search history.

(56) References Cited

U.S. PATENT DOCUMENTS 4,028,725 A   6/1977   Lewis
5,808,589 A   9/1998   Fergason
(Continued)

FOREIGN PATENT DOCUMENTS

WO   9521395 A1   8/1995

OTHER PUBLICATIONS

International Search Report and Written Opinion, Application No. PCT/FI2017/050828, dated Mar. 21, 2018, 14 pages.

*Primary Examiner* — Michael Faragalla
(74) *Attorney, Agent, or Firm* — Ziegler IP Law Group, LLC

(57) ABSTRACT

A display apparatus and method of displaying, via the display apparatus. The display apparatus includes context image renderer for rendering context image; focus image renderer for rendering focus image; exit optical element; and optical combiner for optically combining projection of the rendered context image with projection of the rendered focus image to create visual scene. The optical combiner includes first semi-transparent reflective element; and a second semi-transparent reflective element. The context image renderer is arranged in a manner that projection of rendered context image is incident upon first semi-transparent reflective element and reflected towards exit optical element therefrom. The focus image renderer is arranged in a manner that projection of rendered focus image is incident upon first semi-transparent reflective element and reflected towards second semi-transparent reflective element, and then reflected towards first semi-transparent reflective element, from where projection thereof is allowed to pass through towards exit optical element.

16 Claims, 6 Drawing Sheets

(51) Int. Cl.
  *G06T 11/60* (2006.01)
  *G02B 27/14* (2006.01)
  *G02B 26/08* (2006.01)
  *G02B 27/01* (2006.01)
  *G02B 27/00* (2006.01)

(52) U.S. Cl.
  CPC ....... *G02B 27/0172* (2013.01); *G02B 27/145* (2013.01); *G06T 11/60* (2013.01)

(56) References Cited

U.S. PATENT DOCUMENTS

2016/0240013 A1* 8/2016 Spitzer .................... G06F 3/013
2016/0342840 A1* 11/2016 Mullins .............. G06K 9/00671

* cited by examiner

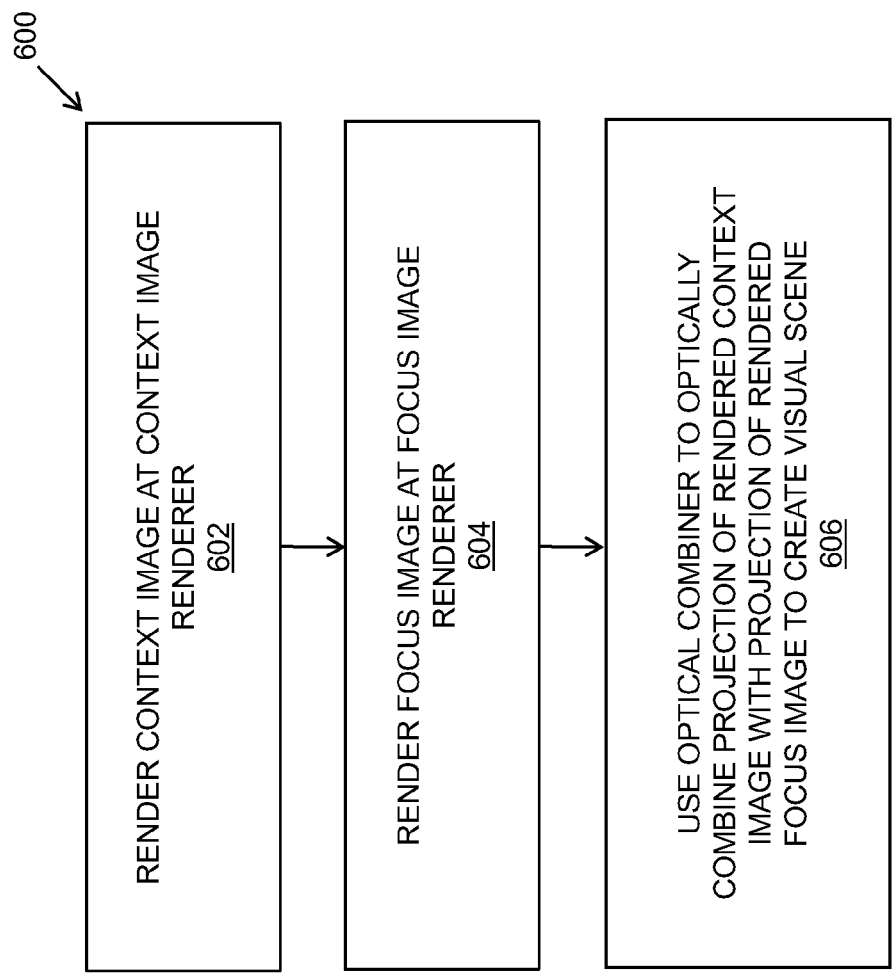

DISPLAY APPARATUS AND METHOD OF DISPLAYING USING CONTEXT AND FOCUS IMAGE RENDERERS AND OPTICAL COMBINERS

CROSS-REFERENCE TO RELATED APPLICATIONS

This application is a continuation-in-part of U.S. patent application Ser. No. 15/366,424, titled "DISPLAY APPARATUS AND METHOD OF DISPLAYING USING FOCUS AND CONTEXT DISPLAYS" and filed on Dec. 1, 2016, which is incorporated herein by reference.

TECHNICAL FIELD

The present disclosure relates generally to virtual and augmented reality; and more specifically, to display apparatuses comprising context and focus image renderers, exit optical elements and optical combiners. Furthermore, the present disclosure also relates to methods of displaying via the aforementioned display apparatuses.

BACKGROUND

In recent times, there have been rapid advancements in development and use of technologies such as virtual reality, augmented reality, and so forth, for presenting a simulated environment to a user. Specifically, such technologies provide the user with a feeling of complete involvement (namely, immersion) within the simulated environment by employing contemporary techniques such as stereoscopy. Therefore, such simulated environments provide the user with an enhanced perception of reality around him/her. Moreover, such simulated environments relate to fully virtual environments (namely, virtual reality) as well as real world environments including virtual objects therein (namely, augmented reality).

Typically, the user may use a specialized device, for example, such as a virtual reality device or an augmented reality device, for experiencing such simulated environments. Generally, the virtual and augmented reality devices are binocular devices having separate display optics for each eye of the user. Furthermore, such specialized devices include optical elements therein to render and project constituent images that are employed for presenting the simulated environment to the user. Examples of the virtual reality devices include, head mounted virtual reality devices, virtual reality glasses, and so forth. Furthermore, examples of the augmented reality devices include augmented reality headsets, augmented reality glasses, and so forth.

However, conventional virtual and augmented reality devices have certain limitations. Firstly, such devices are susceptible to introduction of significant chromatic aberrations and optical distortions whilst projecting the constituent images towards the eyes of the user. Such chromatic aberrations and optical distortions severely diminish quality of the user's experience of the simulated environment. Secondly, the optical elements may be arranged in a complex manner within the conventional virtual and augmented reality devices, thereby often introducing obstructions within paths of projection of the constituent images. Thirdly due to aforesaid complex arrangement of optical elements, in conventional virtual and augmented reality devices, multiple optical elements have to be adjusted to change size of the projection of images. Furthermore, changing position (namely, location) of the projection of images, in a single or multiple planes, is substantially difficult in such complex arrangements.

Therefore, in light of the foregoing discussion, there exists a need to overcome the aforementioned drawbacks associated with conventional virtual and augmented reality devices.

SUMMARY

The present disclosure seeks to provide a display apparatus. The present disclosure also seeks to provide a method of displaying, via such a display apparatus. The present disclosure seeks to provide a solution to the existing problem of chromatic aberrations and optical distortions in images displayed by conventional virtual and augmented reality devices. An aim of the present disclosure is to provide a solution that overcomes at least partially the problems encountered in the prior art, and provides a robust, reliable and efficient display apparatus.

In one aspect, an embodiment of the present disclosure provides a display apparatus comprising:
- at least one context image renderer for rendering a context image;
- at least one focus image renderer for rendering a focus image;
- an exit optical element; and
- at least one optical combiner for optically combining a projection of the rendered context image with a projection of the rendered focus image to create a visual scene, an angular width of the projection of the rendered context image being greater than an angular width of the projection of the rendered focus image, the at least one optical combiner comprising:
  - a first semi-transparent reflective element having a first side and a second side, the first side facing the exit optical element; and
  - a second semi-transparent reflective element facing the second side of the first semi-transparent reflective element, wherein the at least one context image renderer is arranged in a manner that the projection of the rendered context image emanating therefrom is incident upon the first side of the first semi-transparent reflective element and reflected towards the exit optical element therefrom, and wherein the at least one focus image renderer is arranged in a manner that the projection of the rendered focus image emanating therefrom is incident upon the second side of the first semi-transparent reflective element and reflected towards the second semi-transparent reflective element therefrom, and is then reflected from the second semi-transparent reflective element towards the first semi-transparent reflective element, from where the projection of the rendered focus image is allowed to pass through towards the exit optical element.

In another aspect, an embodiment of the present disclosure provides a method of displaying, via a display apparatus comprising at least one context image renderer, at least one focus image renderer, an exit optical element and at least one optical combiner, the at least one optical combiner comprising a first semi-transparent reflective element and a second semi-transparent reflective element, the first semi-transparent reflective element having a first side facing the exit optical element and a second side facing the second semi-transparent reflective element, the method comprising:
- rendering a context image at the at least one context image renderer;

rendering a focus image at the at least one focus image renderer; and using the at least one optical combiner to optically combine a projection of the rendered context image with a projection of the rendered focus image to create a visual scene, an angular width of the projection of the rendered context image being greater than an angular width of the projection of the rendered focus image, wherein the at least one context image renderer is arranged in a manner that the projection of the rendered context image emanating therefrom is incident upon the first side of the first semi-transparent reflective element and reflected towards the exit optical element therefrom, and wherein the at least one focus image renderer is arranged in a manner that the projection of the rendered focus image emanating therefrom is incident upon the second side of the first semi-transparent reflective element and reflected towards the second semi-transparent reflective element therefrom, and is then reflected from the second semi-transparent reflective element towards the first semi-transparent reflective element, from where the projection of the rendered focus image is allowed to pass through towards the exit optical element.

Embodiments of the present disclosure substantially eliminate or at least partially address the aforementioned problems in the prior art, and enables elimination of chromatic aberrations and optical distortions in images displayed by display apparatuses.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIG. 6 illustrates steps of a method of displaying via the display apparatus, in accordance with an embodiment of the present disclosure.

Figure 1:
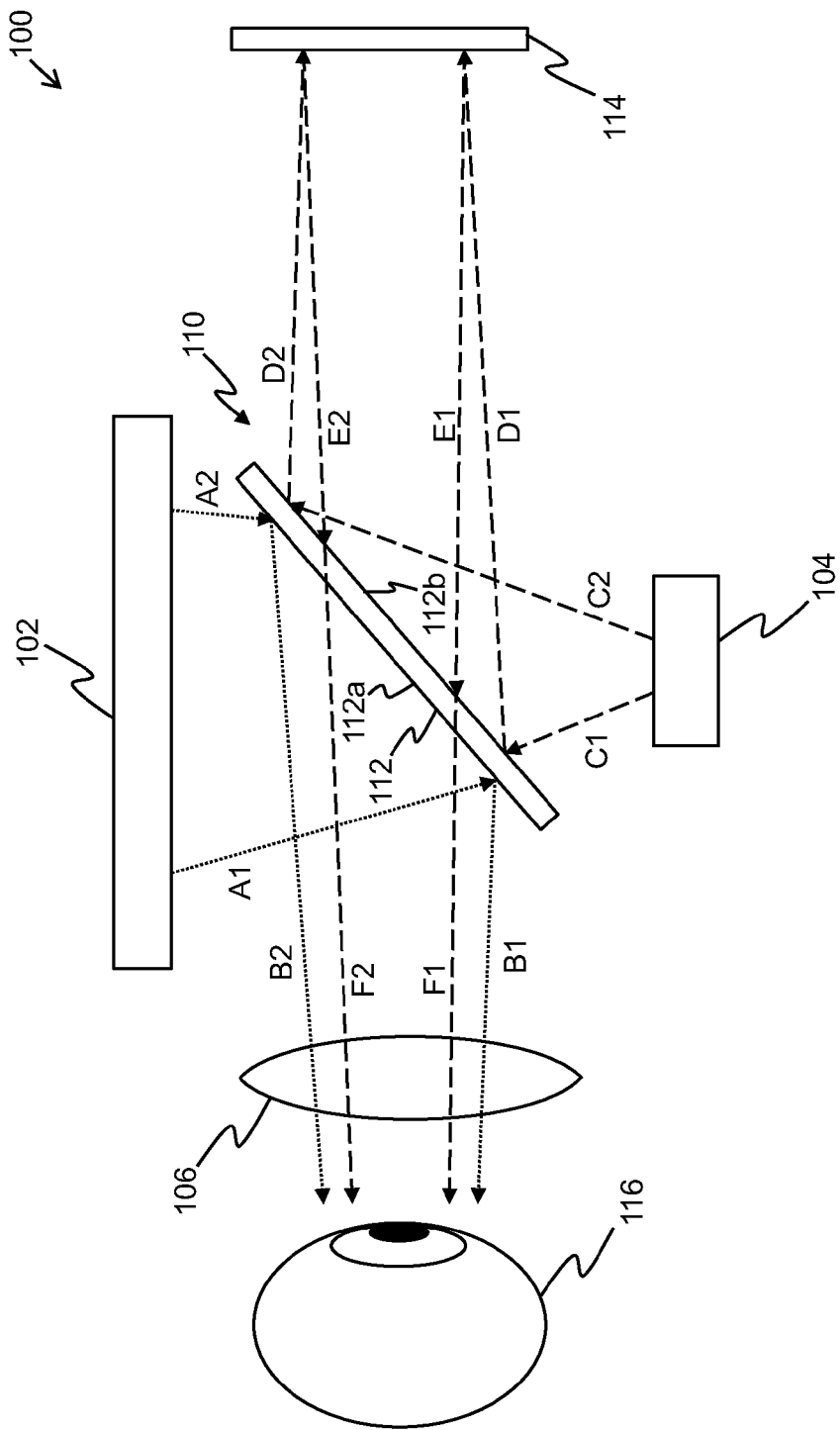
FIGS. 1-5 are exemplary implementations of a display apparatus, in accordance with various embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a display apparatus comprising:

at least one context image renderer for rendering a context image;

at least one focus image renderer for rendering a focus image;

an exit optical element; and at least one optical combiner for optically combining a projection of the rendered context image with a projection of the rendered focus image to create a visual scene, an angular width of the projection of the rendered context image being greater than an angular width of the projection of the rendered focus image, the at least one optical combiner comprising:

a first semi-transparent reflective element having a first side and a second side, the first side facing the exit optical element; and a second semi-transparent reflective element facing the second side of the first semi-transparent reflective element, wherein the at least one context image renderer is arranged in a manner that the projection of the rendered context image emanating therefrom is incident upon the first side of the first semi-transparent reflective element and reflected towards the exit optical element therefrom, and wherein the at least one focus image renderer is arranged in a manner that the projection of the rendered focus image emanating therefrom is incident upon the second side of the first semi-transparent reflective element and reflected towards the second semi-transparent reflective element therefrom, and is then reflected from the second semi-transparent reflective element towards the first semi-transparent reflective element, from where the projection of the rendered focus image is allowed to pass through towards the exit optical element.

In another aspect, an embodiment of the present disclosure provides a method of displaying, via a display apparatus comprising at least one context image renderer, at least one focus image renderer, an exit optical element and at least one optical combiner, the at least one optical combiner comprising a first semi-transparent reflective element and a second semi-transparent reflective element, the first semi-transparent reflective element having a first side facing the exit optical element and a second side facing the second semi-transparent reflective element, the method comprising:

rendering a context image at the at least one context image renderer;

rendering a focus image at the at least one focus image renderer; and using the at least one optical combiner to optically combine a projection of the rendered context image with a projection of the rendered focus image to create a visual scene, an angular width of the projection of the rendered context image being greater than an angular width of the projection of the rendered focus image, wherein the at least one context image renderer is arranged in a manner that the projection of the rendered context image emanating therefrom is incident upon the first side of the first semi-transparent reflective element and reflected towards the exit optical element therefrom, and wherein the at least one focus image renderer is arranged in a manner that the projection of the rendered focus image emanating therefrom is incident upon the second side of the first semi-transparent reflective element and reflected towards the second semi-transparent reflective element therefrom, and is then reflected from the second semi-transparent reflective element towards the first semi-transparent reflective element, from where the projection of the rendered focus image is allowed to pass through towards the exit optical element.

The present disclosure provides the aforementioned display apparatus and the aforementioned method of displaying, via such a display apparatus. The display apparatus described herein allows for elimination of chromatic aberrations and optical distortions in images displayed by the display apparatus. Furthermore, the display apparatus facilitates a change in size of images projected therein, through minimal adjustment of optical elements employed in the display apparatus. Additionally, arrangement of optical elements in the display apparatus provides minimal obstruction in path of the images projected therein. Moreover, position of the images projected within the display apparatus may be changed relatively easily in single or multiple planes.

As mentioned previously, the at least one context image renderer renders the context image and the at least one focus image renderer renders the focus image.

Throughout the present disclosure, the term "context image" relates to an image of the visual scene, to be rendered and projected via the display apparatus. Furthermore, throughout the present disclosure, the term "focus image" relates to another image depicting a part (namely, a portion) of the visual scene, to be rendered and projected via the display apparatus. Therefore, it is to be understood that the focus image is dimensionally smaller than the context image.

It will be appreciated that the context and focus images described herein, are employed to present the visual scene of a simulated environment (for example, such as a virtual reality environment, an augmented reality environment, and so forth) to a user of the display apparatus, when the display apparatus is worn by the user. In such an instance, the display apparatus is operable to act as a device (for example, such as a virtual reality headset, a pair of virtual reality glasses, an augmented reality headset, a pair of augmented reality glasses and the like) for presenting the simulated environment to the user.

As mentioned previously, the angular width of the projection of the rendered context image is greater than the angular width of the projection of the rendered focus image. Optionally, the angular width of the projection of the rendered context image ranges from 40 degrees to 220 degrees, whereas an angular width of a projection of the rendered focus image ranges from 5 degrees to 60 degrees.

Throughout the present disclosure, the term "angular width" refers to an angular width of a given projection as seen from the user's eyes, when the display apparatus is worn by the user. It will be appreciated that the angular width of the projection of the rendered context image is greater than the angular width of the projection of the rendered focus image since the rendered focus image is typically projected on and around the fovea of the user's eyes, whereas the rendered context image is projected upon the retina of the user's eyes.

Throughout the present disclosure, the term "context image renderer" relates to equipment configured to facilitate rendering of the context image, whereas the term "focus image renderer" relates to equipment configured to facilitate rendering of the focus image.

Optionally, the context image renderer and/or the focus image renderer are implemented by way of at least one projector and a projection screen associated therewith.

Optionally, the context image renderer is implemented by way of at least one context display configured to emit the projection of the rendered context image therefrom. Similarly, optionally, the focus image renderer is implemented by way of at least one focus display configured to emit the projection of the rendered focus image therefrom.

As mentioned previously, the at least one optical combiner optically combines the projection of the rendered context image with the projection of the rendered focus image to create the visual scene. The at least one optical combiner comprises the first semi-transparent reflective element and the second semi-transparent reflective element.

In one embodiment, the term "at least one optical combiner" relates to equipment for optically combining at least the projection of the rendered context image with the projection of the rendered focus image to create the visual scene. It will be appreciated that the at least one optical combiner includes optical and/or mechanical elements (for example, such as, beam splitters, semi-transparent mirrors, prisms, waveguides, polarizers, actuators, active optical elements, and the like) in order to implement the aforesaid optical combination operation.

Furthermore, the first semi-transparent reflective element has the first side and the second side, the first side facing the exit optical element, and the second side facing the at least one focus image renderer. In an example, the first side and the second side are obliquely facing the exit optical element and the at least one focus image renderer, respectively.

In an embodiment, the first and second sides of the first semi-transparent reflective element are opposite to each other.

Optionally, the first side of the first semi-transparent reflective element is substantially reflective.

Moreover, optionally, the second side of the first semi-transparent reflective element is substantially transmissive, reflective or combination thereof.

Optionally, the first semi-transparent reflective element is implemented by way of at least one of: a semi-transparent mirror, a semi-transparent film, a beam splitter, a prism, a polarizer, a lens, an optical waveguide, an off-axis parabolic mirror. In an example, the semi-transparent mirror for implementing the first semi-transparent reflective element may be a pellicle mirror.

As an example, the first semi-transparent reflective element could be implemented by way of a semi-transparent mirror, wherein the first and second sides of the semi-transparent mirror are opposite to each other. Optionally, in such an example, the first side of the semi-transparent mirror may be substantially reflective whereas the second side of the semi-transparent mirror may be substantially transmissive, reflective or both.

As another example, the first semi-transparent reflective element could be implemented by way of an off-axis parabolic mirror, wherein the first and second sides of the off-axis parabolic mirror are opposite to each other.

Optionally, the first semi-transparent reflective element is static. In such an instance, a position of the first semi-transparent reflective element within the display apparatus is fixed. It will be appreciated that the aforesaid static arrangement (namely, placement) of the first semi-transparent reflective element allows for simplification of optical paths of the projection of the rendered context image and the projection of the rendered focus image. Beneficially, such a static first semi-transparent reflective element allows for reduction in geometric and chromatic aberrations within the display apparatus. Consequently, optical distortion of the focus and context images is substantially minimized.

As mentioned previously, the at least one optical combiner comprises the second semi-transparent reflective element facing the second side of the first semi-transparent reflective element. In an example, the second side of the first semi-transparent reflective element is obliquely facing the second semi-transparent reflective element.

Optionally, the second semi-transparent reflective element is implemented by way of at least one of: a semi-transparent mirror, a semi-transparent film, a fully reflective mirror, a beam splitter, a prism, a polarizer, a lens, an optical waveguide. In an example, the second semi-transparent reflective element is implemented by way of the fully reflective mirror. In such an instance, the fully reflective mirror may be semi-transparent.

In an embodiment, the second semi-transparent reflective element is curved in shape. It will be appreciated that the curve shape of the second semi-transparent reflective element can be in any suitable direction and shape, for example such as an outside-in hemisphere, an inside-out hemisphere, a parabolic shape, and so forth. Beneficially, the curved shape of the second semi-transparent reflective element allows for a potential increase in field of view of the display apparatus and allows for a reduction in size of the display apparatus. It will be appreciated that the curved shape of the second semi-transparent reflective element also allows for a reduction in geometric and chromatic aberrations occurring within the display apparatus.

In another embodiment, the second semi-transparent reflective element is flat (namely, planar) in shape. In yet another embodiment, the second semi-transparent reflective element is freeform in shape. Optionally, in this regard, the freeform shape is implemented as a combination of flat and curved surfaces including protrusions and depressions on a surface of the second semi-transparent reflective element.

As mentioned previously, in the display apparatus, the at least one context image renderer is arranged in a manner that the projection of the rendered context image emanating therefrom is incident upon the first side of the first semi-transparent reflective element and reflected towards the exit optical element therefrom. It will be appreciated that in such an instance, optical properties (namely, reflection characteristics) the first semi-transparent reflective element, allow for controlling the optical path of the projection of the rendered context image, in the aforesaid manner.

In an exemplary implementation, the projection of the rendered context image is incident upon the first side of the first semi-transparent reflective element. The first side of the first semi-transparent reflective element is substantially reflective and allows the projection of the rendered context image to reflect therefrom. Furthermore, the projection of the rendered context image reflects from the first semi-transparent reflective element, and is directed towards the exit optical element.

Furthermore, in the display apparatus, the at least one focus image renderer is arranged in a manner that the projection of the rendered focus image emanating therefrom is incident upon the second side of the first semi-transparent reflective element and reflected towards the second semi-transparent reflective element therefrom, and is then reflected from the second semi-transparent reflective element towards the first semi-transparent reflective element, from where the projection of the rendered focus image is allowed to pass through towards the exit optical element. It will be appreciated that in such an instance, optical properties (namely, reflection and/or transmission characteristics) the first semi-transparent reflective element and the second semi-transparent reflective element, allow for controlling the optical path of the projection of the rendered focus image, in the aforesaid manner.

In an exemplary implementation, the projection of the rendered focus image is incident upon the second side of the first semi-transparent reflective element. The second side of the first semi-transparent reflective element is substantially reflective and allows the projection of the rendered focus image to reflect from the first semi-transparent reflective element. Furthermore, the reflected projection of the rendered focus image is directed towards the second semi-transparent reflective element. The reflected projection of the rendered focus image is incident upon the second semi-transparent reflective element, and is further reflected therefrom. Consequently, upon the aforementioned reflection from the second semi-transparent reflective element, the projection of the rendered focus image is directed towards the second side of the first semi-transparent reflective element. Optionally, the second side of the first semi-transparent reflective element is substantially transmitive, and allows the projection of the rendered focus image to pass therethrough towards the exit optical element.

In another exemplary implementation, the first semi-transparent reflective element is implemented by way of the off-axis parabolic mirror. In such an instance, the projection of the rendered focus image is incident upon the second side of the off-axis parabolic mirror, wherein the off-axis parabolic mirror is configured to collimate the projection of the rendered focus image incident thereupon whilst reflecting the projection of the rendered focus image towards the second semi-transparent reflective element. Therefore, the collimated projection of the rendered focus image is incident upon the second semi-transparent reflective element and is reflected substantially parallelly to the incident collimated projection, from the second semi-transparent reflective element. Thereafter, upon the aforesaid reflection from the second semi-transparent reflective element, the projection of the rendered focus image is directed towards the off-axis parabolic mirror, from where the projection of the rendered focus image is allowed to pass through towards the exit optical element. It will be appreciated that use of an active optical element such as the aforesaid off-axis parabolic mirror allows for the focus image to appear at optical infinity (namely, at an infinite distance from the user's eyes). Beneficially, in such an instance, the focus image appears to be static with respect to the visual scene incident upon the user's eyes, even upon movement of the user's eyes.

Throughout the present disclosure, the term "exit optical element" relates to an optical device configured to direct the projection of the rendered context image and the projection of the rendered focus image, towards the eyes of the user of the display apparatus, when the display apparatus is worn by the user.

Optionally, the exit optical element receives the projection of the rendered context image and the projection of the rendered focus image, from the first semi-transparent reflective element, and modifies an optical path and/or optical characteristics of at least one of the projection of the rendered context image and the projection of the rendered focus image, prior to directing the aforesaid projections onto the eyes of the user. In one example, the exit optical element may magnify a size (or angular dimensions) of the projection of the rendered focus image. In such a case, use of a magnifying optical element allows for use of dimensionally small components within the display apparatus.

Furthermore, optionally, the exit optical element is implemented by way of at least one of: a convex lens, a plano-convex lens, a Liquid Crystal (LC) lens, a liquid lens, a Fresnel lens, aspherical lens, achromatic lens.

Optionally, the exit optical element has a curved surface facing the first semi-transparent reflective element. In such an instance, the curved surface may be convex (namely, bulging towards the first semi-transparent reflective element) or concave (namely, bulging inwards, away from the first semi-transparent reflective element).

Optionally, the at least one optical combiner further comprises at least one first actuator for moving the second semi-transparent reflective element, the display apparatus further comprising a processor coupled to the at least one first actuator, the processor being configured to control the at least one first actuator to adjust a tilt of the second semi-transparent reflective element to change a location of the projection of the rendered focus image incident upon the exit optical element. In such an instance, the processor may control the at least one first actuator by generating an actuation signal (such as an electric current, hydraulic pressure, mechanical power, and so forth). It will be appreciated that by employing the at least one first actuator, the location of the projection of the rendered focus image can be changed (namely, adjusted) without moving the at least one focus image renderer. Beneficially, the at least one first actuator adjusts the tilt of the second semi-transparent reflective element, to adjust the location of the projection of the rendered focus image along a single plane (namely, either horizontally or vertically) or along multiple planes (namely, both horizontally and vertically).

Optionally, such movement of the second semi-transparent reflective element further comprises at least one of: displacement of the second semi-transparent reflective element, rotation of the second semi-transparent reflective element.

Optionally, the processor could be implemented by way of hardware, software, firmware or a combination thereof, suitable for controlling the operation of the display apparatus. Optionally, the processor is configured to control the operation of the display apparatus to present (namely, to project) the visual scene onto the eyes of the user. Furthermore, the processor may or may not be external to the device.

Optionally, the at least one optical combiner further comprises at least one second actuator for moving the at least one focus image renderer, the processor being coupled to the at least one second actuator, the processor being configured to control the at least one second actuator to adjust a tilt of the at least one focus image renderer to change the location of the projection of the rendered focus image incident upon the exit optical element. In such an instance, the processor may control the at least one second actuator by generating an actuation signal (such as an electric current, hydraulic pressure, mechanical power, and so forth). It will be appreciated that by employing the at least one second actuator, the location of the projection of the rendered focus image can be changed (namely, adjusted) by moving the at least one focus image renderer. Beneficially, the at least one second actuator adjusts the tilt of the at least one focus image renderer, to adjust the location of the projection of the rendered focus image along a single plane (namely, either horizontally or vertically) or along multiple planes (namely, both horizontally and vertically).

Optionally, the at least one focus image renderer is tilted by at least one second actuator about a first axis, whereas the second semi-transparent reflective element is tilted by at least one first actuator about a second axis. Alternatively, only the second semi-transparent reflective element is tilted by at least one second actuator, namely about the first and second axes.

Optionally, such movement of the at least one focus image renderer further comprises at least one of: displacement of the at least one focus image renderer, rotation of the at least one focus image renderer.

Optionally, at least one of the first side and/or the second side of the first semi-transparent reflective element has polarizing properties. Optionally, in this regard, the first side and/or the second side of the first semi-transparent reflective element is configured to allow only light waves of a predefined polarization orientation to pass therethrough, whilst blocking (namely, via reflecting, absorbing, or a combination thereof) light waves of other polarization orientations.

More optionally, the polarizing properties of the first side and/or the second side of the first semi-transparent reflective element comprise at least the predefined polarization orientation associated with the first side and/or the second side of the first semi-transparent reflective element.

Optionally, the polarizing properties of the first side and/or the second side of the first semi-transparent reflective element are adjustable. Optionally, the polarization properties of the first side of the first semi-transparent reflective element are manually adjustable. Alternatively, optionally, the processor is configured to perform (namely, implement) the aforesaid adjustment.

Furthermore, optionally, the first side and/or the second side of the first semi-transparent reflective element are implemented by way of at least one of: thin film polarizer, Polaroid® polarizing filter, absorptive crystal polarizer, birefringent polarizer. As an example, the first side and/or the second side of the first semi-transparent reflective element may be implemented by way of a thin film polarizer including a substrate (for example, such as glass, plate, mirror, prism, waveguide, and the like) whereon a thin film of a specialized optical coating is applied. In such a case, the specialized optical coating (for example, such as a dielectric material) may be configured to implement the desired polarization effect. As another example, the first side and/or the second side of the first semi-transparent reflective element may be implemented as a birefringent polarizer (for example, such as a Liquid Crystal variable retarder).

Optionally, the display apparatus further comprises a polarization retarder or retardation layer positioned between the first semi-transparent reflective element and the second semi-transparent reflective element. The polarization retarder or retardation layer is employed in an instance when the first side of the first semi-transparent reflective element optionally has polarizing properties. In such a case, a combination of properties of the polarization retarder or retardation layer and the polarizing properties of the first side of the first semi-transparent reflective element, allow for achieving a desired polarization effect within the display apparatus.

Therefore, throughout the present disclosure, the term "polarization retarder or retardation layer" relates to an optical element configured to alter a polarization orientation of light waves incident thereupon.

More optionally, optical retardance of the polarization retarder or retardation layer is one of: $\pi/2$ (namely, 90 degrees), or $\pi$ (namely, 180 degrees).

In an exemplary implementation, the display apparatus may comprise a quarter wave retardation layer positioned between the first semi-transparent reflective element and the second semi-transparent reflective element.

In such an example, the first side of the first semi-transparent reflective element may be configured to allow only s-polarized light waves to pass therethrough, whilst blocking the light waves of other polarization orientations. Therefore, in such an example, p-polarized light waves within the projection of the rendered context image emanating from the at least one context image renderer may reflect from the first side of the first semi-transparent reflective element, towards the exit optical element. Furthermore, in such an example, p-polarized light waves within the projection of the rendered focus image emanating from the at least one focus image renderer may reflect from the second side of the first semi-transparent reflective element, towards the quarter wave retardation layer. Such s-polarized light waves are incident on the quarter wave retardation layer that is configured to alter polarization orientation of the s-polarized light waves into p-polarization. Therefore, p-polarization light waves of the projection of the rendered focus image are incident upon the second semi-transparent reflective element, and are reflected therefrom, towards the second side of the first semi-transparent reflective element. Consequently, when p-polarized light waves of the projection of the rendered focus image are incident upon the first side of the first semi-transparent reflective element, the projection of the rendered focus image passes through the first side towards the exit optical element.

Optionally, the display apparatus further comprises a gaze-tracking unit comprising at least one photo sensor for sensing reflections of light from a user's eye when the display apparatus is worn by the user, wherein the at least one photo sensor is positioned behind the second semi-transparent reflective element. In such an instance, the second semi-transparent reflective element is substantially transparent so as to allow the aforesaid reflections of light to be received by the at least one photo sensor. Notably, the photo sensor is well-aligned with the user's eye, without coming in an optical path of the projection of the focus image.

Throughout the present disclosure, the term "gaze-tracking unit" relates to specialized equipment for detecting and/or following a direction of gaze of the user of the display apparatus, when the user of the display apparatus views the visual scene. Beneficially, an accurate detection of the gaze direction facilitates the display apparatus to closely implement gaze contingency thereon.

It is to be understood that the gaze-tracking unit may also be referred to as an "eye-tracker system", a "means for detecting a gaze direction", or a "gaze-tracking system".

Optionally, the second semi-transparent reflective element is arranged to allow a projection of a real-world image to pass through towards the first semi-transparent reflective element, whereat the projection of the real-world image is optically combined with the projection of the rendered context image and the projection of the rendered focus image to create the visual scene. In such an instance, the second semi-transparent reflective element is substantially transparent (namely, has substantial transmissive properties) to allow the projection of the real-world image to pass therethrough. It will be appreciated that in such a case, the visual scene created by the aforesaid optical combination presents the simulated environment (for example, such as the augmented reality environment) to the user of the display apparatus. In an example, the focus image and the context image depicts at least one virtual object to be overlaid on the projection of the real-world image so as to create the visual scene.

Examples of the at least one virtual object include, but are not limited to, a virtual navigation tool (for example, such as a virtual map, virtual direction signage, and so forth), a virtual gadget (for example, such as a virtual calculator, a virtual computer, and so forth), a virtual message (for example, such as a virtual instant message, a virtual chat conversation, a virtual to-do note), a virtual entity (for example, such as a virtual person, a virtual animal, and so forth), and a virtual media (for example, such as a virtual video, a virtual interactive advertisement, a virtual news, virtual data, and so forth).

Optionally, the display apparatus further comprises at least one optical filter for adjusting light transmittance of the projection of the real-world image passing through the at least one optical filter, wherein the at least one optical filter is positioned behind the second semi-transparent reflective element. Optionally, the at least one optical filter is associated with at least two optical properties such that selection of one property among two properties allows the projection of the real-world image to pass therethrough and selection of another property blocks passage of the projection of the real-world image therethrough. Optionally, the at least one optical filter is mechanically switchable. Alternatively, optionally, the at least one optical filter is electrically switchable.

Optionally, the at least one optical filter is semi-transparent in nature. Alternatively, optionally, the at least one optical filter is opaque in nature. Optionally, the at least one optical filter is configured to move to either allow or block blocks the passage of the projection of the real-world image therethrough. In such an instance, the at least one optical filter is operatively coupled to an actuator for movement thereof, and coupled to the processor for receiving instructions for such movement.

Optionally, the at least one optical filter is implemented by way of at least one of: a Liquid Crystal shutter, an electrochromic filter.

As an example, the at least one optical filter is implemented by way of a Liquid Crystal shutter. Optionally, the Liquid Crystal shutter comprises at least one liquid crystal film arranged between two layers of a substrate, wherein the two layers of the substrate are electrically coupled to the processor via a plurality of electrical connectors. Examples of the substrate include, but are not limited to, a transparent glass substrate, a semi-transparent glass substrate, a transparent plastic substrate, and a semi-transparent plastic substrate. In such an example, the processor may generate at least one excitation signal to adjust the light transmittance of the projection of the real-world image passing through the Liquid Crystal shutter. Optionally, a voltage and/or frequency of the at least one excitation signal allows for the Liquid Crystal shutter to transmit and/or reflect light of at least one wavelength. Optionally, in this regard, the aforesaid transmissive and/or reflective properties of the Liquid Crystal shutter may change upon change in the at least one excitation signal. For example, a Liquid Crystal shutter OF1 may only transmit light of 500 nanometer wavelength when an excitation signal S1 is applied thereto, but the Liquid Crystal shutter OF1 may become fully transmissive to light of all wavelengths if the excitation signal S1 is removed. Furthermore, optionally, properties of the at least one liquid crystal film also allow for controlling transmission and/or reflection of light through the at least one optical filter. Examples of such properties include, but are not limited to, composition/material of the at least one liquid crystal film, crystal alignment within the at least one liquid crystal film, and thickness of the at least one liquid crystal film. For example, a 1 volt excitation signal may be applied to a 5 micrometer thick liquid crystal film of a liquid crystal shutter, to transmit light of wavelengths between 390 nanometer and 700 nanometer, whilst reflecting light of all other wavelengths. Optionally, the voltage and/or frequency of the excitation signal allows for the Liquid Crystal shutter to transmit and/or reflect light of at least one polarization orientation. For example, a 2 volt excitation signal may be applied to a first liquid crystal film of a liquid crystal shutter LCS1 to allow only light of a first polarization orientation to pass therethrough whilst a 3 volt excitation signal may be applied to a second liquid crystal film of the liquid crystal shutter LCS1 to allow only light of a second polarization orientation to pass therethrough. It will be appreciated that different liquid crystal films may be employed to control transmission and/or reflection of light of different wavelengths and/or polarization orientations by providing different excitation signals to the different liquid crystal films. Alternatively, a single liquid crystal film may be employed to control transmission and/or reflection of light of different wavelengths and/or polarization orientations by providing different excitation signals to the single liquid crystal film.

As another example, the at least one optical filter is implemented by way of an electrochromic filter. Optionally, the electrochromic filter comprises at least one film of electrochromic material arranged between two layers of a substrate, wherein the two layers of the substrate are electrically coupled to the processor via a plurality of electrical connectors. Examples of the substrate include, but are not limited to, a transparent glass substrate, a semi-transparent glass substrate, a transparent plastic substrate, and a semi-transparent plastic substrate. In such an example, the processor may generate at least one excitation signal to adjust the light transmittance of the projection of the real-world image passing through the electrochromic filter. Optionally, a voltage and/or frequency of the at least one excitation signal allows for the electrochromic filter to transmit and/or reflect light of at least one wavelength. For example, a 2 volt excitation signal may be applied to a first film of electrochromic material of an electrochromic filter EF1 to allow only light of 390 nanometer to 700 nanometer (namely, visible spectrum) to pass therethrough whilst a 3 volt excitation signal may be applied to a second film of electrochromic material of the electrochromic filter EF1 to allow only light of 800 nanometer to 900 nanometer to pass therethrough.

Optionally, the physical size (or dimensions) of the at least one context image renderer and the at least one focus image renderer may not limit operation of the display apparatus described hereinabove. Optionally, physically small sized context image renderer and focus image renderer may be used along with a lens (for example, such as an enlarging lens, a collimating lens, and so forth) in the optical paths of the projections of the rendered context and/or focus images to ensure desired size and/or desired optical path of the projections thereof. As an example, a lens (for example, such as a convex lens) may be positioned on the optical path of the projection of the rendered focus image. As another example, a collimating lens may be positioned on the optical path of the projection of the rendered focus image, between the focus image renderer and the first semi-transparent reflective element, to allow for collimating the projection of the rendered focus image.

The present disclosure also relates to the method as described above. Various embodiments and variants disclosed above apply mutatis mutandis to the method.

DETAILED DESCRIPTION OF THE DRAWINGS

Referring to FIGS. 1-5, illustrated are exemplary implementations of a display apparatus, in accordance with various embodiments of the present disclosure. It is to be understood by a person skilled in the art that the FIGS. 1-5 include simplified arrangements for implementation of the display apparatus for the sake of clarity, which should not unduly limit the scope of the claims herein. The person skilled in the art will recognize many variations, alternatives, and modifications of embodiments of the present disclosure.

Referring to FIG. 1, illustrated is an exemplary implementation of a display apparatus 100, in accordance with an embodiment of the present disclosure. The display apparatus 100 includes at least one context image renderer, such as a context image renderer 102, for rendering a context image; at least one focus image renderer, such as a focus image renderer 104, for rendering a focus image; an exit optical element 106, and at least one optical combiner 110 for optically combining a projection of the rendered context image with a projection of the rendered focus image to create a visual scene. The at least one optical combiner 110 includes a first semi-transparent reflective element 112 and a second semi-transparent reflective element 114. The first semi-transparent reflective element 112 includes a first side 112a and a second side 112b, and the first side 112a faces the exit optical element 106. The second semi-transparent reflective element 114 faces the second side 112b of the first semi-transparent reflective element 112.

The at least one context image renderer 102 is arranged in a manner that the projection of the rendered context image emanating therefrom, depicted by rays A1, A2, is incident upon the first side 112a of the first semi-transparent reflective element 112 and reflected towards the exit optical element 106 therefrom, depicted by rays B1, B2. The at least one focus image renderer 104 is arranged in a manner that the projection of the rendered focus image emanating therefrom, depicted by rays C1, C2, is incident upon the second side 112b of the first semi-transparent reflective element 112 and reflected towards the second semi-transparent reflective element 114 therefrom, depicted by rays D1, D2, and is then reflected from the second semi-transparent reflective element 114 towards the first semi-transparent reflective element 112, depicted by rays E1, E2, from where the projection of the rendered focus image is allowed to pass through towards the exit optical element 106, depicted by rays F1, F2. The rays B1, B2 (associated with the projection of the rendered context image) reflected from the first side 112a of the first semi-transparent reflective element 112 and the rays F1, F2 (associated with the projection of the rendered focus image) passing through the first semi-transparent reflective element 112 create the visual scene for an eye 116.

Figure 2:
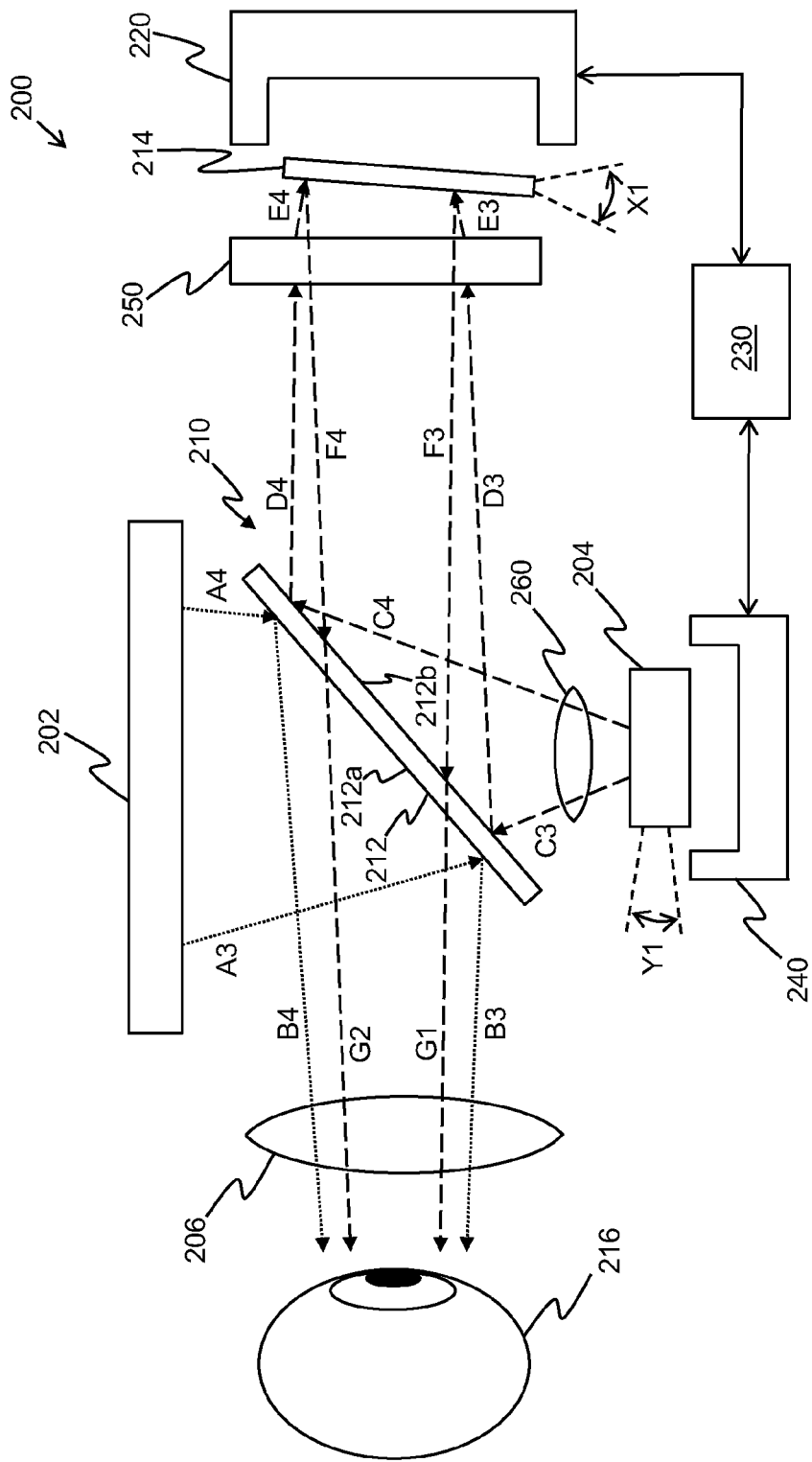

Referring to FIG. 2, illustrated is an exemplary implementation of a display apparatus 200, in accordance with another embodiment of the present disclosure. The display apparatus 200 includes at least one context image renderer, such as a context image renderer 202, for rendering a context image; at least one focus image renderer, such as a focus image renderer 204, for rendering a focus image; an exit optical element 206, and at least one optical combiner 210 for optically combining a projection of the rendered context image with a projection of the rendered focus image to create a visual scene. The at least one optical combiner 210 includes a first semi-transparent reflective element 212 and a second semi-transparent reflective element 214. The first semi-transparent reflective element 212 includes a first side 212a and a second side 212b, and the first side 212a faces the exit optical element 206. The second semi-transparent reflective element 214 faces the second side 212b of the first semi-transparent reflective element 212. The at least one optical combiner 210 further includes at least one first actuator, such as a first actuator 220, for moving the second semi-transparent reflective element 214. The display apparatus 200 further includes a processor 230 coupled to the at least one first actuator 220. The processor 230 is configured to control the at least one first actuator 220 to adjust a tilt, depicted by an arrow X1, of the second semi-transparent reflective element 214 to change a location of the projection of the rendered focus image incident upon the exit optical element 206.

The at least one optical combiner 210 further includes at least one second actuator, such as a second actuator 240, for moving the at least one focus image renderer 204. The processor 230 is coupled to the at least one second actuator 240 and the processor 230 is configured to control the at least one second actuator 240 to adjust a tilt, depicted by an arrow Y1, of the at least one focus image renderer 204 to change the location of the projection of the rendered focus image incident upon the exit optical element 206. The display apparatus 200 further includes a polarization retarder 250 (or retardation layer) positioned between the first semi-transparent reflective element 212 and the second semi-transparent reflective element 214. The display apparatus 200 further includes a lens 260 positioned between the at least one focus image renderer 204 and the second side 212b of the first semi-transparent reflective element 212.

The at least one context image renderer 202 is arranged in a manner that the projection of the rendered context image emanating therefrom, depicted by rays A3, A4, is incident upon the first side 212a of the first semi-transparent reflective element 212 and reflected towards the exit optical element 206 therefrom, depicted by rays B3, B4. The at least one focus image renderer 204 is arranged in a manner that the projection of the rendered focus image emanating therefrom passes through the lens 260, depicted by rays C3, C4, is incident upon the second side 212b of the first semi-transparent reflective element 212 and reflected towards the polarization retarder 250, depicted by rays D3, D4. The rays D3, D4 thereafter passes through the polarization retarder 250 and incident on the second semi-transparent reflective element 214, depicted by rays E3, E4, and is then reflected from the second semi-transparent reflective element 214 towards the first semi-transparent reflective element 212, depicted by rays F3, F4, from where the projection of the rendered focus image is allowed to pass through towards the exit optical element 206, depicted by rays G1, G2. The rays B3, B4 (associated with the projection of the rendered context image) reflected from the first side 212a of the first semi-transparent reflective element 212 and the rays G1, G2 (associated with the projection of the rendered focus image) passing through the first semi-transparent reflective element 212 create the visual scene for an eye 216.

Figure 3:
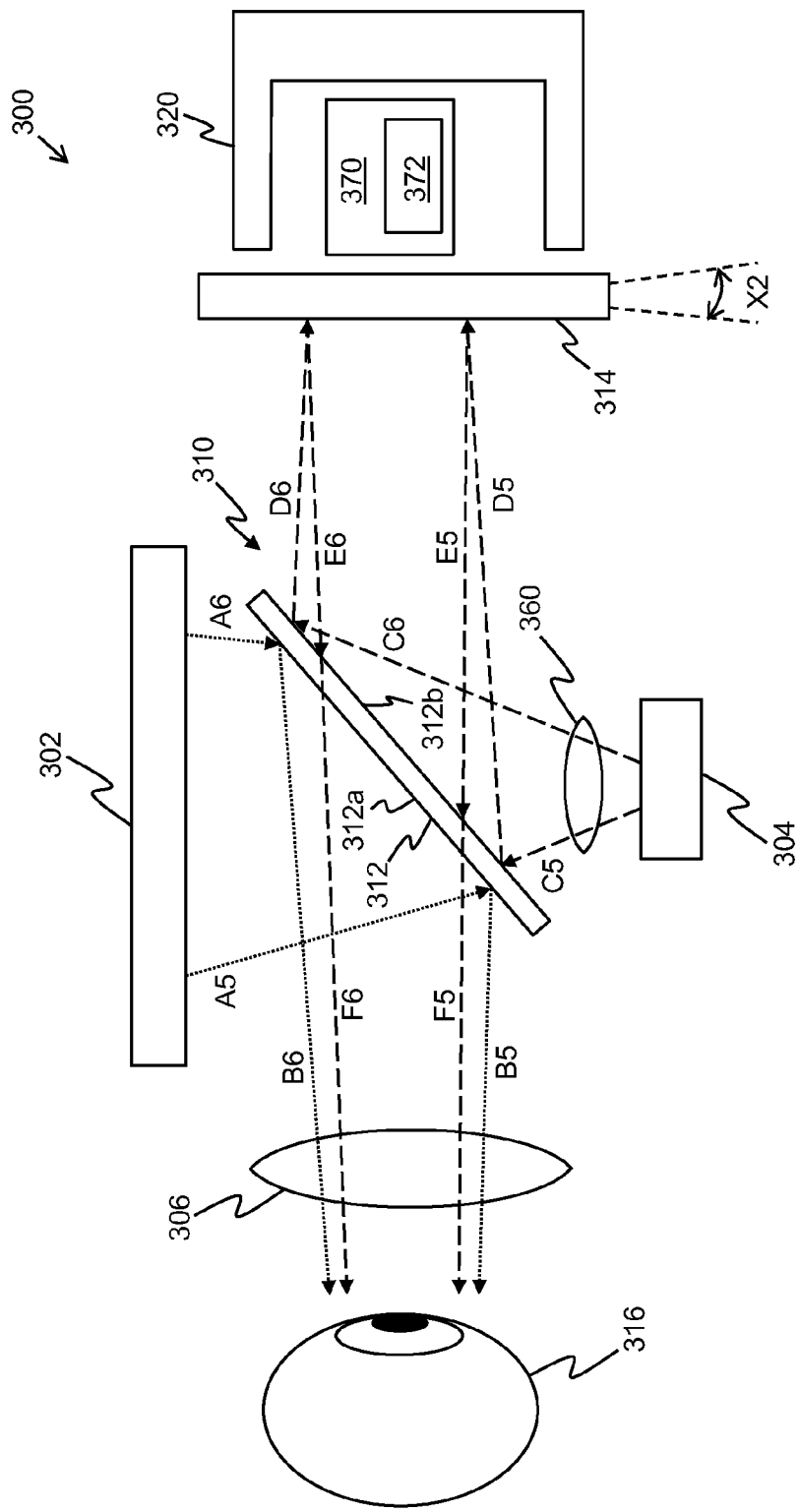

Referring to FIG. 3, illustrated is an exemplary implementation of a display apparatus 300, in accordance with another embodiment of the present disclosure. The display apparatus 300 includes at least one context image renderer, such as a context image renderer 302, for rendering a context image; at least one focus image renderer, such as a focus image renderer 304, for rendering a focus image; an exit optical element 306, and at least one optical combiner 310 for optically combining a projection of the rendered context image with a projection of the rendered focus image to create a visual scene. The at least one optical combiner 310 includes a first semi-transparent reflective element 312 and a second semi-transparent reflective element 314. The first semi-transparent reflective element 312 includes a first side 312a and a second side 312b, and the first side 312a faces the exit optical element 306. The second semi-transparent reflective element 314 faces the second side 312b of the first semi-transparent reflective element 312. The at least one optical combiner 310 further includes at least one first actuator, such as a first actuator 320, for moving the second semi-transparent reflective element 314. It will be appreciated that the display apparatus 300 optionally includes a processor (not shown), such as the processor 230 shown in FIG. 2, coupled to the at least one first actuator 320. The processor is configured to control the at least one first actuator 320 to adjust a tilt, depicted by an arrow X2, of the second semi-transparent reflective element 314 to change a location of the projection of the rendered focus image incident upon the exit optical element 306. The display apparatus 300 further includes a lens 360 positioned between the at least one focus image renderer 304 and the second side 312b of the first semi-transparent reflective element 312. The display apparatus 300 further includes a gaze-tracking unit 370 having at least one photo sensor 372 for sensing reflections of light from a user's eye 316 when the display apparatus 300 is worn by the user (not shown). The at least one photo sensor 372 is positioned behind the second semi-transparent reflective element 314. Furthermore, it will be appreciated that the gaze-tracking unit 370 optionally operatively coupled to the processor.

The at least one context image renderer 302 is arranged in a manner that the projection of the rendered context image emanating therefrom, depicted by rays A5, A6, is incident upon the first side 312a of the first semi-transparent reflective element 312 and reflected towards the exit optical element 306 therefrom, depicted by rays B5, B6. The at least one focus image renderer 304 is arranged in a manner that the projection of the rendered focus image emanating therefrom passes through the lens 360, depicted by rays C5, C6, is incident upon the second side 312b of the first semi-transparent reflective element 312 and reflected towards the second semi-transparent reflective element 314, depicted by rays D5, D6, and is then reflected from the second semi-transparent reflective element 314 towards the first semi-transparent reflective element 312, depicted by rays E5, E6, from where the projection of the rendered focus image is allowed to pass through towards the exit optical element 306, depicted by rays F5, F6. The rays B3, B4 (associated with the projection of the rendered context image) reflected from the first side 312a of the first semi-transparent reflective element 312, and the rays F5, F6 (associated with the projection of the rendered focus image) passing through the first semi-transparent reflective element 312 create the visual scene for the eye 316.

Figure 4:
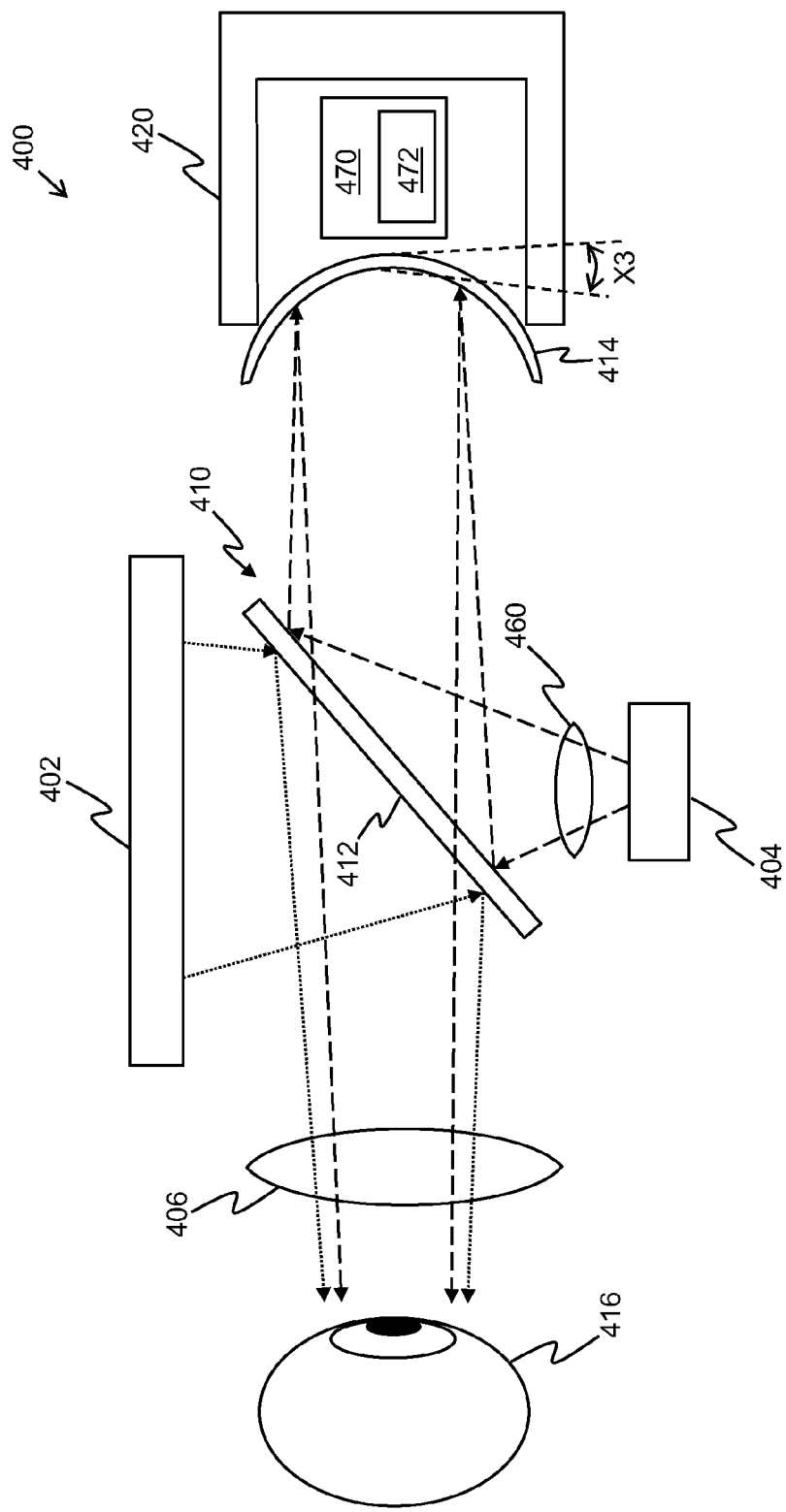

Referring to FIG. 4, illustrated is an exemplary implementation of a display apparatus 400, in accordance with another embodiment of the present disclosure. The display apparatus 400 is substantially structurally and functionally similar to the display apparatus 300 explained herein above in conjunction with FIG. 3. For example, the display apparatus 400 also includes at least one context image renderer, such as a context image renderer 402, at least one focus image renderer, such as a focus image renderer 404, an exit optical element 406, at least one optical combiner 410 having a first semi-transparent reflective element 412 and a second semi-transparent reflective element 414, at least one first actuator, such as a first actuator 420, a lens 460, and a gaze-tracking unit 470 having at least one photo sensor 472. However, the second semi-transparent reflective element 414 is curved in shape, as compared to the second semi-transparent reflective element 314 (shown in FIG. 3) which is flat (namely, planar) in shape. Furthermore, it will be appreciated that the display apparatus 400 optionally includes a processor (not shown), such as the processor 230 shown in FIG. 2, coupled to the at least one first actuator 420. The processor is configured to control the at least one first actuator 420 to adjust a tilt, depicted by an arrow X3, of the second semi-transparent reflective element 414 to change a location of the projection of the rendered focus image incident upon the exit optical element 406. The at least one optical combiner 410 accordingly optically combines a projection of the rendered context image with a projection of the rendered focus image to create a visual scene for an eye 416.

Figure 5:
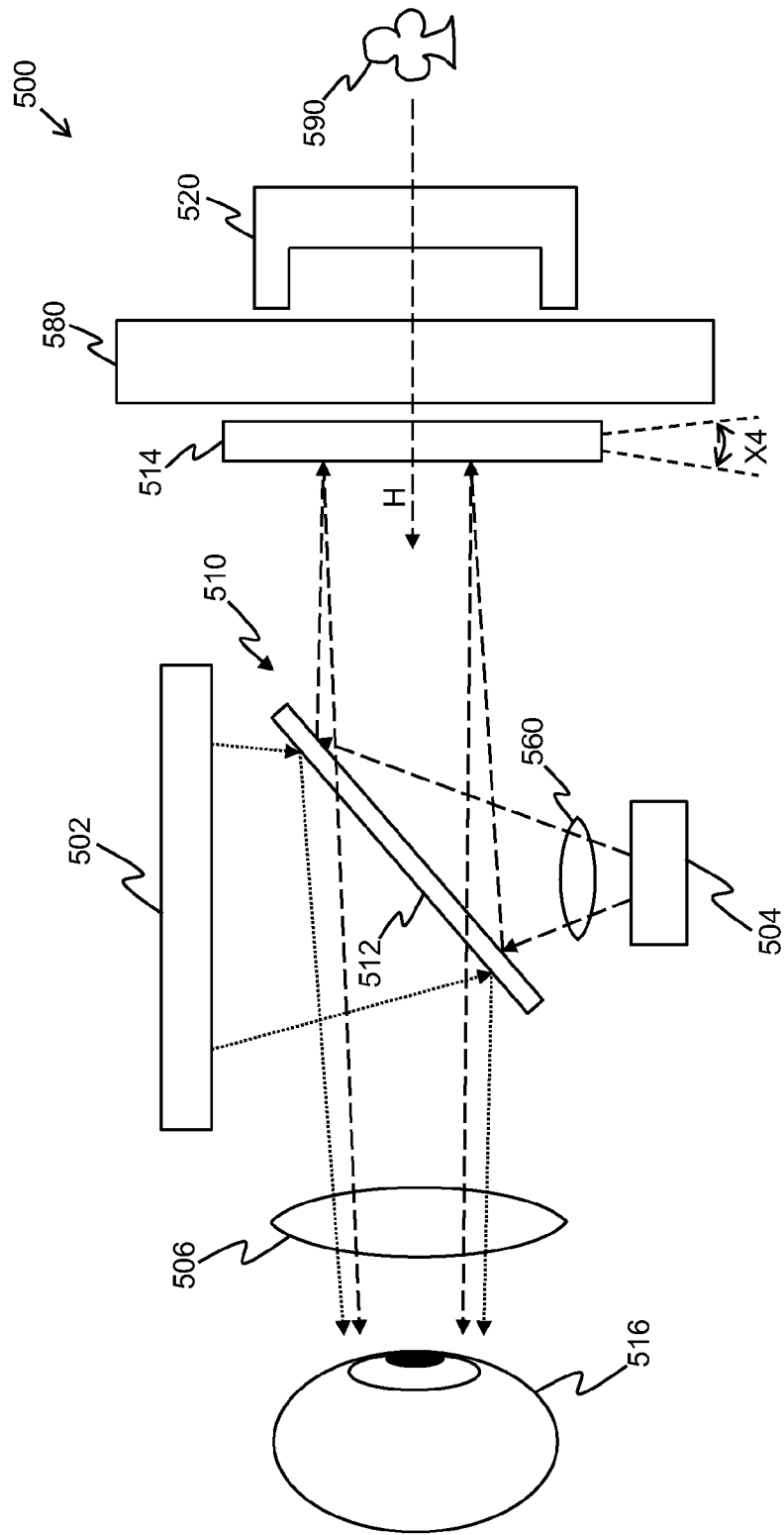

Referring to FIG. 5, illustrated is an exemplary implementation of a display apparatus 500, in accordance with another embodiment of the present disclosure. The display apparatus 500 is substantially structurally and functionally similar to the display apparatus 300 explained herein above in conjunction with FIG. 3. For example, the display apparatus 500 also includes at least one context image renderer, such as a context image renderer 502, at least one focus image renderer, such as a focus image renderer 504, an exit optical element 506, at least one optical combiner 510 having a first semi-transparent reflective element 512 and a second semi-transparent reflective element 514, at least one first actuator, such as a first actuator 520, and a lens 560. However, the display apparatus 500 further includes at least one optical filter, such as an optical filter 580, instead of the gaze-tracking unit 470 shown in FIG. 4, positioned behind the second semi-transparent reflective element 514. Furthermore, the second semi-transparent reflective element 514 is arranged to allow a projection of a real-world image 590, depicted by a ray H, to pass through towards the first semi-transparent reflective element 512, whereat the projection of the real-world image 590 is optically combined with the projection of the rendered context image and the projection of the rendered focus image to create a visual scene for an eye 516. The at least one optical filter 580 allows adjusting light transmittance of the projection of the real-world image 590 passing therethrough. Furthermore, it will be appreciated that the display apparatus 500 optionally includes a processor (not shown), such as the processor 230 shown in FIG. 2, coupled to the at least one first actuator 520. The processor is configured to control the at least one first actuator 520 to adjust a tilt, depicted by an arrow X4, of the second semi-transparent reflective element 514 to change a location of the projection of the rendered focus image incident upon the exit optical element 506.

Referring to FIG. 6, illustrated are steps of a method 600 of displaying via a display apparatus (such as the display apparatus 100 of FIG. 1), in accordance with an embodiment of the present disclosure. At step 602, a context image is rendered at the at least one context image renderer. At step 604, a focus image is rendered at the at least one focus image renderer. At step 606, the at least one optical combiner is used to optically combine a projection of the rendered context image with a projection of the rendered focus image to create a visual scene. An angular width of the projection of the rendered context image is greater than an angular width of the projection of the rendered focus image. The at least one context image renderer is arranged in a manner that the projection of the rendered context image emanating therefrom is incident upon the first side of the first semi-transparent reflective element and reflected towards the exit optical element therefrom. The at least one focus image renderer is arranged in a manner that the projection of the rendered focus image emanating therefrom is incident upon the second side of the first semi-transparent reflective element and reflected towards the second semi-transparent reflective element therefrom, and is then reflected from the second semi-transparent reflective element towards the first semi-transparent reflective element, from where the projection of the rendered focus image is allowed to pass through towards the exit optical element.

The steps 602 to 606 are only illustrative and other alternatives can also be provided where one or more steps are added, one or more steps are removed, or one or more steps are provided in a different sequence without departing from the scope of the claims herein. For example, the method 600 further comprises controlling at least one first actuator of the at least one optical combiner to adjust a tilt of the second semi-transparent reflective element, so as to change a location of the projection of the rendered focus image incident upon the exit optical element. Optionally, the method 600 also comprises controlling at least one second actuator of the at least one optical combiner to adjust a tilt of the at least one focus image renderer, so as to change the location of the projection of the rendered focus image incident upon the exit optical element. Optionally, the apparatus associated with the method 600 further comprises a gaze-tracking unit having at least one photo sensor positioned behind the second semi-transparent reflective element, and the method 600 further comprises using the at least one photo sensor to sense reflections of light from a user's eye when the display apparatus is worn by the user. Optionally, the method 600 further comprises arranging for the second semi-transparent reflective element to allow a projection of a real-world image to pass through towards the first semi-transparent reflective element, whereat the projection of the real-world image is optically combined with the projection of the rendered context image and the projection of the rendered focus image to create the visual scene. More optionally, the apparatus associated with the method 600 further comprises at least one optical filter positioned behind the second semi-transparent reflective element, and the method 600 further comprises using the at least one optical filter to adjust light transmittance of the projection of the real-world image passing through the at least one optical filter.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A display apparatus comprising:
   at least one context image renderer for rendering a context image;

at least one focus image renderer for rendering a focus image;
an exit optical element; and
at least one optical combiner for optically combining a projection of the rendered context image with a projection of the rendered focus image to create a visual scene, an angular width of the projection of the rendered context image being greater than an angular width of the projection of the rendered focus image, the at least one optical combiner comprising:
a first semi-transparent reflective element having a first side and a second side, the first side facing the exit optical element; and
a second semi-transparent reflective element facing the second side of the first semi-transparent reflective element,
wherein the at least one context image renderer is arranged in a manner that the projection of the rendered context image emanating therefrom is incident upon the first side of the first semi-transparent reflective element and reflected towards the exit optical element therefrom, and
wherein the at least one focus image renderer is arranged in a manner that the projection of the rendered focus image emanating therefrom is incident upon the second side of the first semi-transparent reflective element and reflected towards the second semi-transparent reflective element therefrom, and is then reflected from the second semi-transparent reflective element towards the first semi-transparent reflective element, from where the projection of the rendered focus image is allowed to pass through towards the exit optical element.

2. The display apparatus of claim 1, wherein the first semi-transparent reflective element is static.

3. The display apparatus of claim 1, wherein the at least one optical combiner further comprises at least one first actuator for moving the second semi-transparent reflective element, the display apparatus further comprising a processor coupled to the at least one first actuator, the processor being configured to control the at least one first actuator to adjust a tilt of the second semi-transparent reflective element to change a location of the projection of the rendered focus image incident upon the exit optical element.

4. The display apparatus of claim 3, wherein the at least one optical combiner further comprises at least one second actuator for moving the at least one focus image renderer, the processor being coupled to the at least one second actuator, the processor being configured to control the at least one second actuator to adjust a tilt of the at least one focus image renderer to change the location of the projection of the rendered focus image incident upon the exit optical element.

5. The display apparatus of claim 1, wherein at least one of the first side and/or the second side of the first semi-transparent reflective element has polarizing properties.

6. The display apparatus of claim 5, further comprising a polarization retarder or retardation layer positioned between the first semi-transparent reflective element and the second semi-transparent reflective element.

7. The display apparatus of claim 1, further comprising a gaze-tracking unit comprising at least one photo sensor for sensing reflections of light from a user's eye when the display apparatus is worn by the user, wherein the at least one photo sensor is positioned behind the second semi-transparent reflective element.

8. The display apparatus of claim 1, wherein the second semi-transparent reflective element is curved in shape.

9. The display apparatus of claim 1, wherein the second semi-transparent reflective element is arranged to allow a projection of a real-world image to pass through towards the first semi-transparent reflective element, whereat the projection of the real-world image is optically combined with the projection of the rendered context image and the projection of the rendered focus image to create the visual scene.

10. The display apparatus of claim 9, further comprising at least one optical filter for adjusting light transmittance of the projection of the real-world image passing through the at least one optical filter, wherein the at least one optical filter is positioned behind the second semi-transparent reflective element.

11. A method of displaying, via a display apparatus comprising at least one context image renderer, at least one focus image renderer, an exit optical element and at least one optical combiner, the at least one optical combiner comprising a first semi-transparent reflective element and a second semi-transparent reflective element, the first semi-transparent reflective element having a first side facing the exit optical element and a second side facing the second semi-transparent reflective element, the method comprising:
rendering a context image at the at least one context image renderer;
rendering a focus image at the at least one focus image renderer; and
using the at least one optical combiner to optically combine a projection of the rendered context image with a projection of the rendered focus image to create a visual scene, an angular width of the projection of the rendered context image being greater than an angular width of the projection of the rendered focus image,
wherein the at least one context image renderer is arranged in a manner that the projection of the rendered context image emanating therefrom is incident upon the first side of the first semi-transparent reflective element and reflected towards the exit optical element therefrom, and
wherein the at least one focus image renderer is arranged in a manner that the projection of the rendered focus image emanating therefrom is incident upon the second side of the first semi-transparent reflective element and reflected towards the second semi-transparent reflective element therefrom, and is then reflected from the second semi-transparent reflective element towards the first semi-transparent reflective element, from where the projection of the rendered focus image is allowed to pass through towards the exit optical element.

12. The method of claim 11, further comprising controlling at least one first actuator of the at least one optical combiner to adjust a tilt of the second semi-transparent reflective element, so as to change a location of the projection of the rendered focus image incident upon the exit optical element.

13. The method of claim 12, further comprising controlling at least one second actuator of the at least one optical combiner to adjust a tilt of the at least one focus image renderer, so as to change the location of the projection of the rendered focus image incident upon the exit optical element.

14. The method of claim 11, wherein the display apparatus further comprises a gaze-tracking unit comprising at least one photo sensor positioned behind the second semi-transparent reflective element, and wherein the method further comprises using the at least one photo sensor to sense reflections of light from a user's eye when the display apparatus is worn by the user.

15. The method of claim 11, further comprising arranging for the second semi-transparent reflective element to allow a projection of a real-world image to pass through towards the first semi-transparent reflective element, whereat the projection of the real-world image is optically combined with the projection of the rendered context image and the projection of the rendered focus image to create the visual scene.

16. The method of claim 15, wherein the display apparatus further comprises at least one optical filter positioned behind the second semi-transparent reflective element, and the method further comprises using the at least one optical filter to adjust light transmittance of the projection of the real-world image passing through the at least one optical filter.

* * * * *